Aug. 12, 1924.                                      1,504,467
                        W. S. FERDON
                   AIRCRAFT BALANCING SYSTEM
              Filed June 10, 1921      7 Sheets-Sheet 1
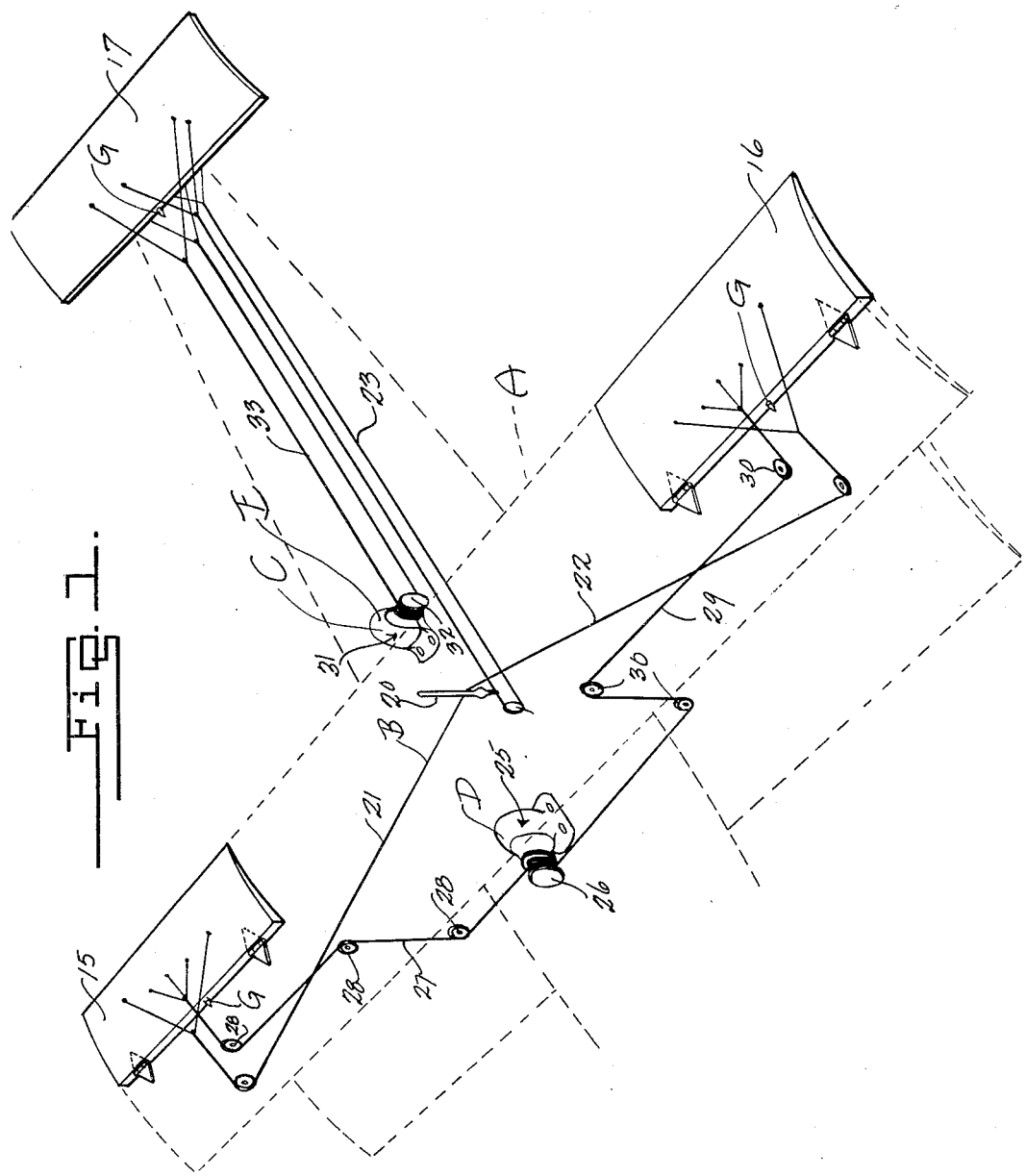
William S. Ferdon.
Inventor
By Lancaster and Allwine
Attorneys

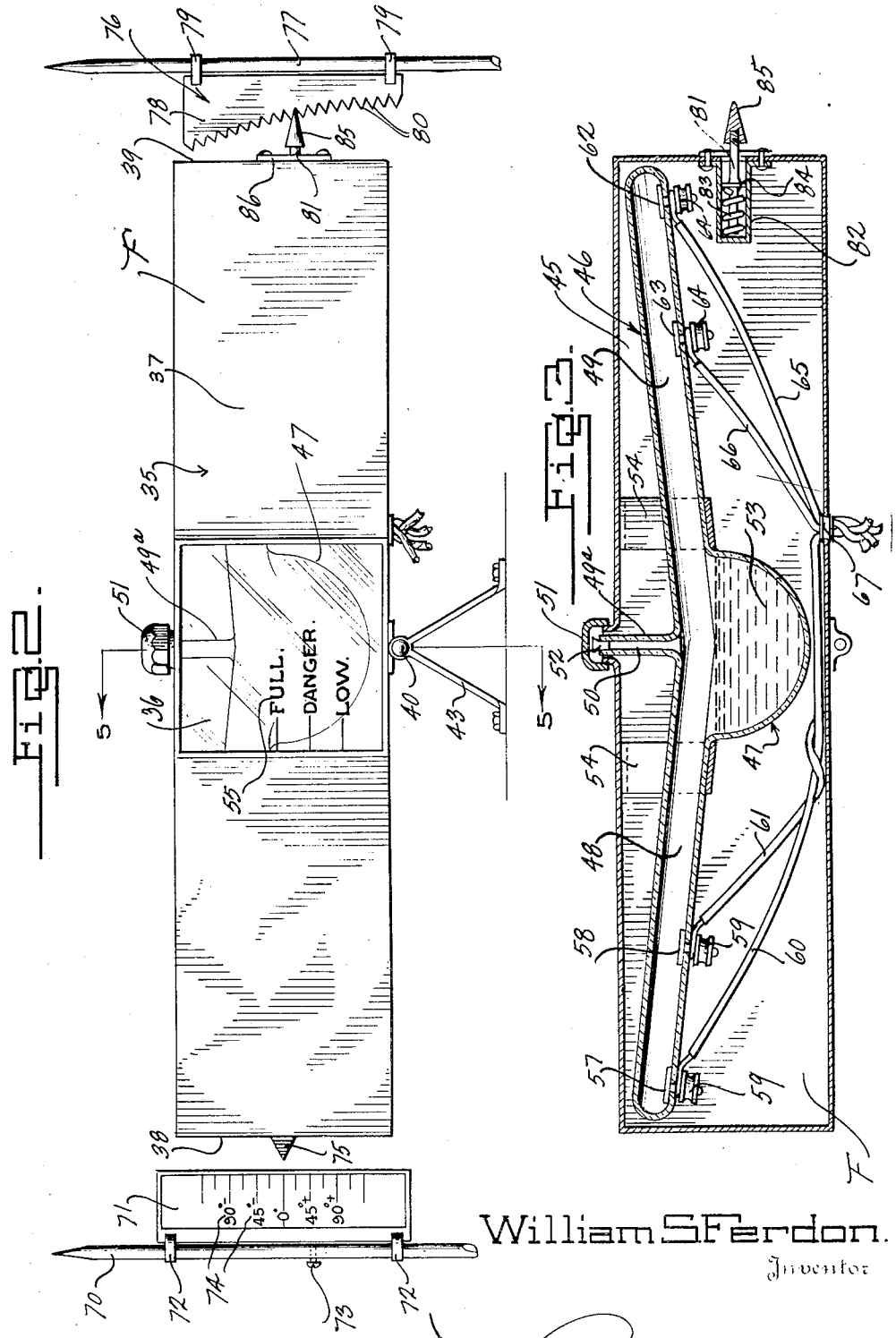

Aug. 12, 1924.
W. S. FERDON
1,504,467
AIRCRAFT BALANCING SYSTEM
Filed June 10, 1921     7 Sheets-Sheet 3
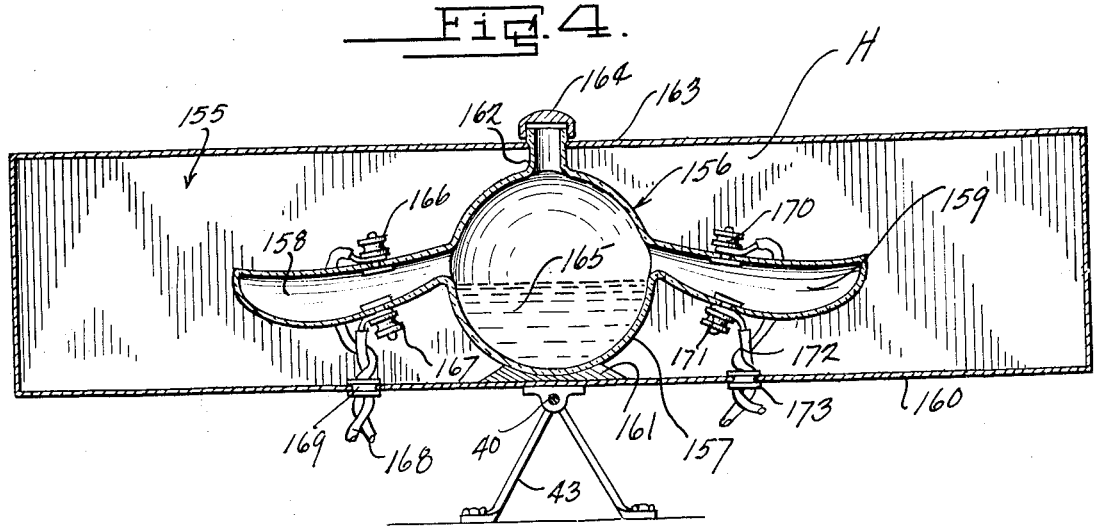
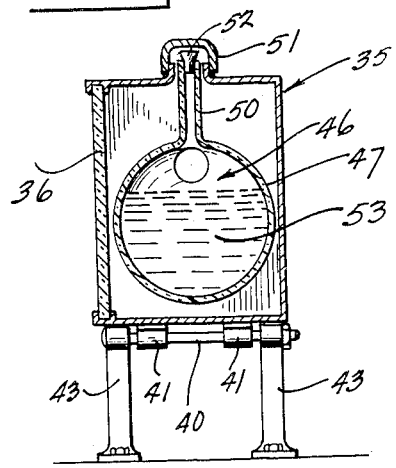

Aug. 12, 1924.
W. S. FERDON
1,504,467
AIRCRAFT BALANCING SYSTEM
Filed June 10, 1921    7 Sheets-Sheet 4
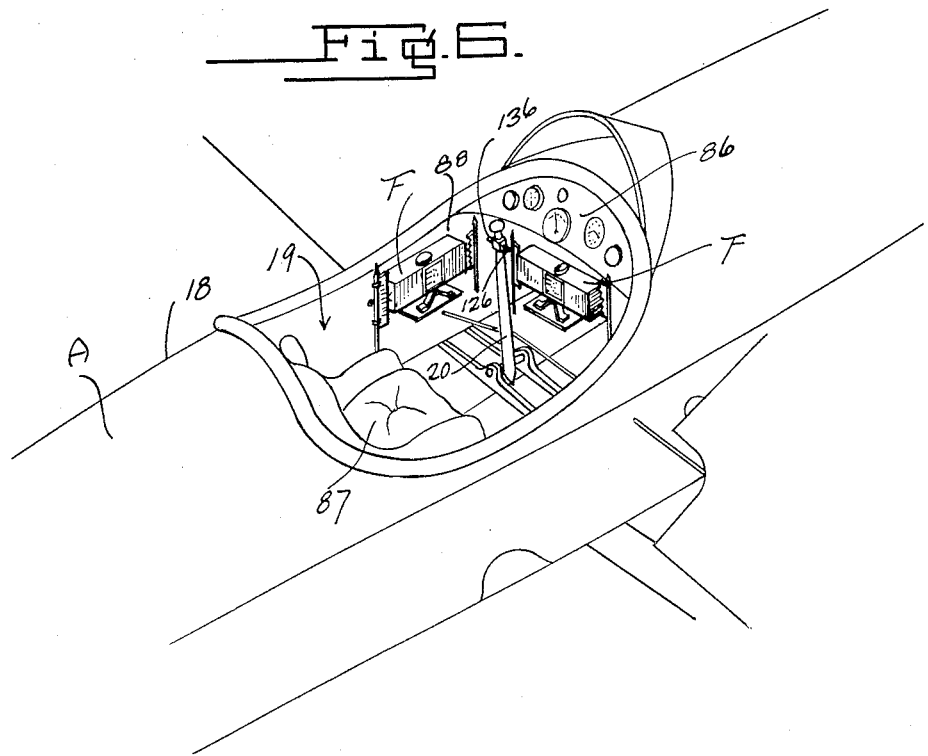
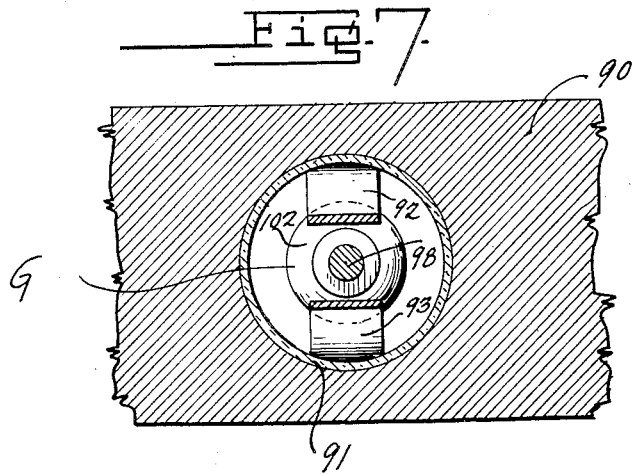
William S. Ferdon.
Inventor
By Lancaster and Allwine
Attorney

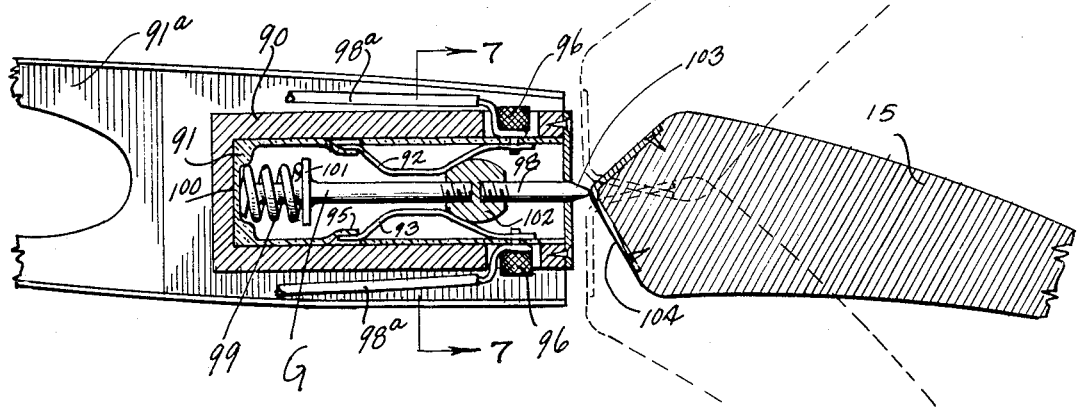
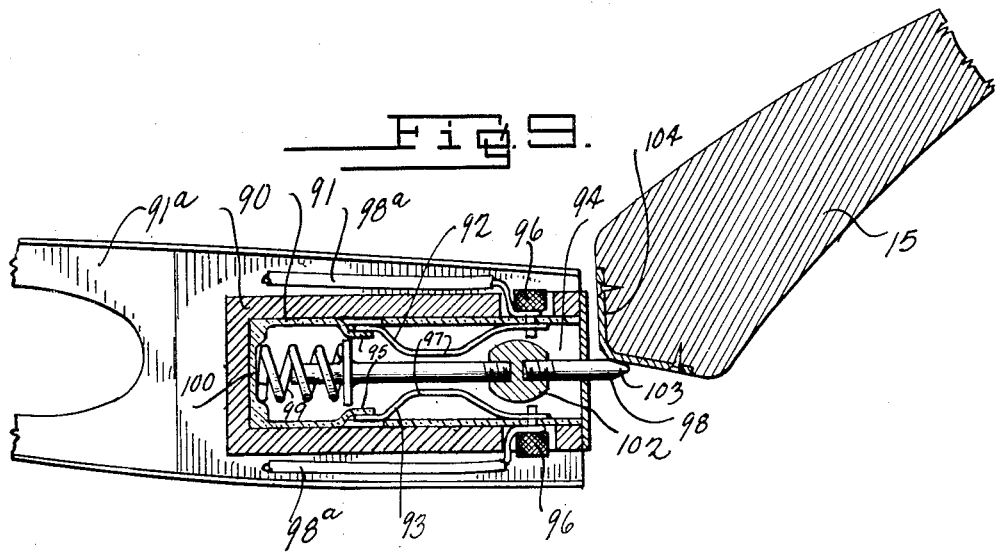

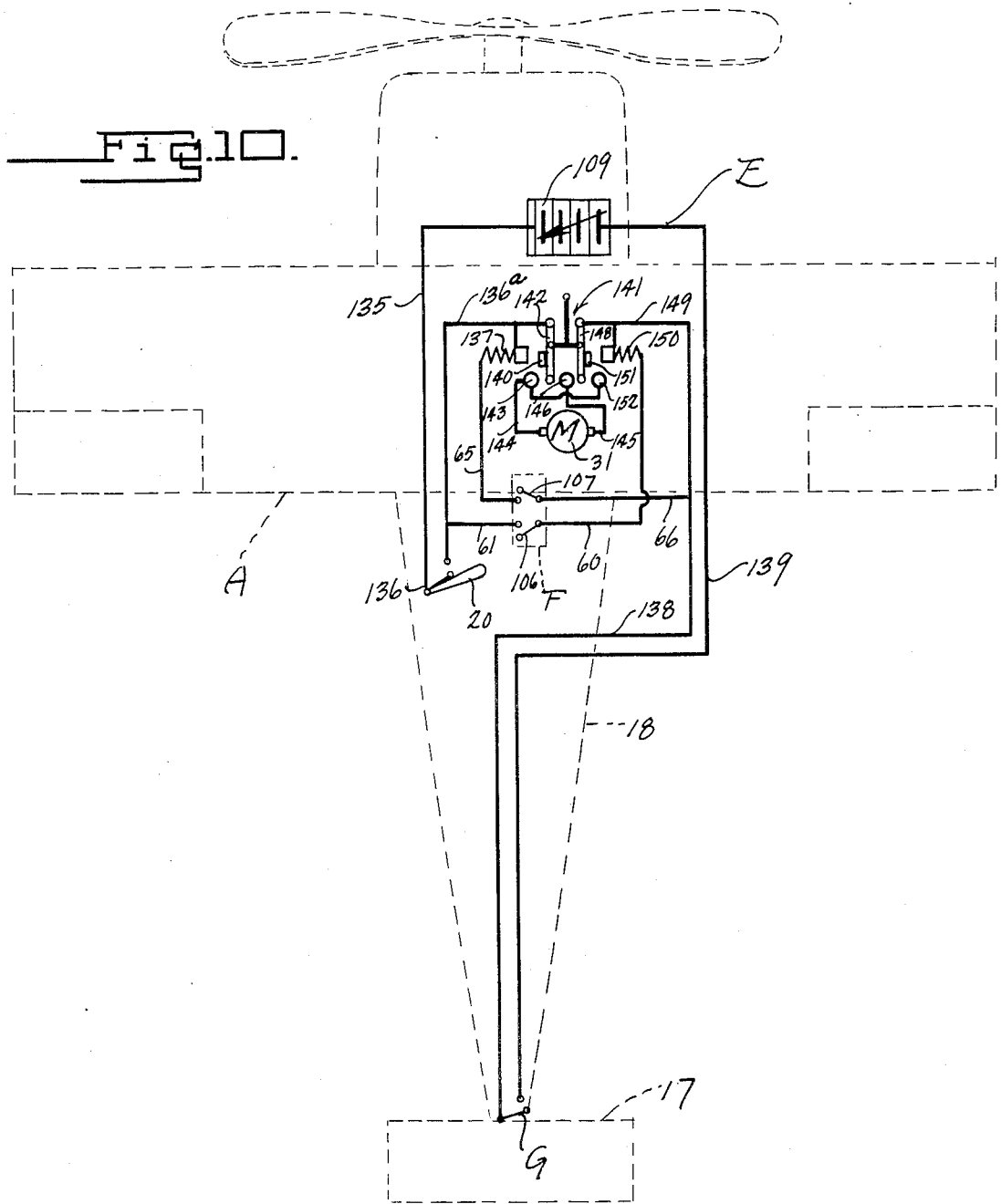

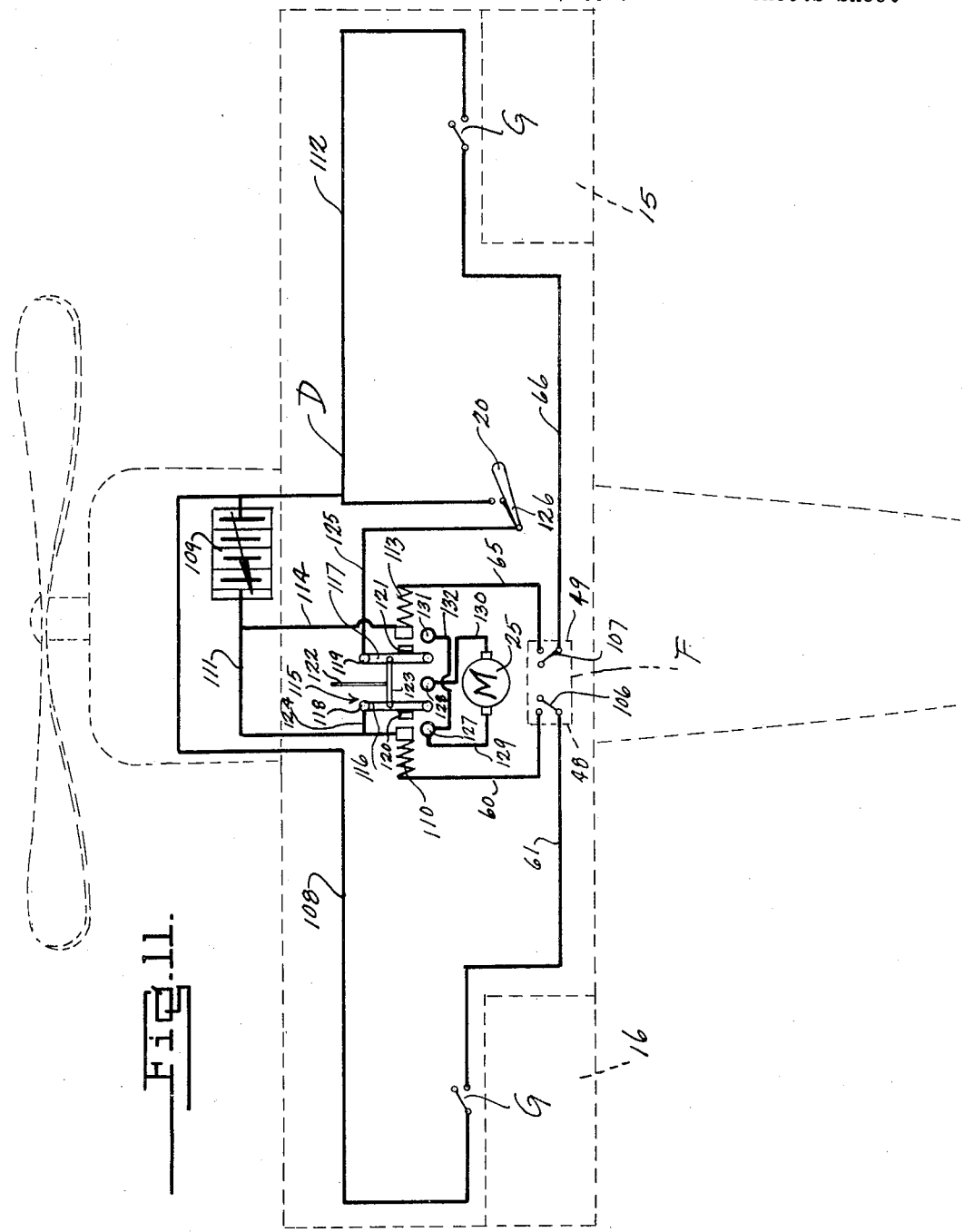

Patented Aug. 12, 1924.

1,504,467

UNITED STATES PATENT OFFICE.

WILLIAM SHAW FERDON, OF BROWNLEE, NEBRASKA.

AIRCRAFT BALANCING SYSTEM.

Application filed June 10, 1921. Serial No. 476,635.

*To all whom it may concern:*

Be it known that I, WILLIAM S. FERDON, a citizen of the United States, residing at Brownlee, in the county of Cherry and State of Nebraska, have invented certain new and useful Improvements in Aircraft Balancing Systems, of which the following is a specification.

This invention relates to an improved balancing system for aircraft.

The primary object of the invention is the provision of an automatic control system for maintaining aircraft in correct flying stability.

A further object of the invention is the provision of a novel and adjustable device for recording the inherent stability and flying attitude of aircraft.

A further object of the invention is the provision of an electrical control surface operating system, including safety cut-out means for preventing operation of control surfaces beyond their maximum safety angle.

A further object of the invention is the provision of an adjustable circuit control device, for gravity operation to actuate a reversible automatic control system.

Other improvements, and important objects will be apparent during the course of the following detailed description.

In the accompanying drawings, forming a part of this specification, and in which similar reference characters designate corresponding parts throughout the several views.

Figure 1 is a fragmentary perspective view of an airplane, showing a standard mechanical control, and the improved automatic control associated therewith.

Figure 2 is a front elevation of an improved circuit control device used in connection with the balancing system.

Figure 3 is a longitudinal cross section through the circuit control device illustrated in Figure 2.

Figure 4 is a longitudinal cross sectional view through a modified form of circuit control device.

Figure 5 is a cross sectional view taken on the line 5—5 of Figure 2.

Figure 6 is a fragmentary perspective view of the cock pit in an airplane fuselage, showing certain details of the improved automatic control system therein.

Figure 7 is a fragmentary, enlarged cross sectional view taken on the line 7—7 of Figure 8.

Figure 8 is a fragmentary view of an airplane wing, and a control surface thereon, showing an improved safety switch therein, in closed contact.

Figure 9 is a view similar to Figure 8 showing the control surface in position with respect to the airplane wing, to maintain the safety switch open.

Figure 10 is a diagrammatic illustration of a wiring diagram, superimposed upon an airplane, in a balancing system, for maintaining longitudinal stability.

Figure 11 is a wiring diagram of an airplane balancing system, superimposed upon an airplane, said balancing system being adapted for control of lateral stability.

In the drawings, wherein for the purpose of illustration is shown the preferred embodiment of my invention, the letter A designates an aircraft of the airplane type, having the standard manual operating means B for actuating surface controls, and the electric operating means C for automatically actuating said surface controls. The electric operating means C preferably comprises the automatic electrical control means D, for maintaining lateral stability of an aircraft; and the automatic electric control means E for maintaining longitudinal stability, said means D and E preferably being independent in their operation. The means D and E each preferably include a compound stability recorder and adjusting circuit control F. The various control surfaces of the aircraft are preferably equipped with safety switches G of novel formation. It is preferred that the lateral and longitudinal stability systems D and E preferably use the circuit control means F. However, a special circuit control device H is provided for use in connection with aircraft having an excessive sway.

The improved balancing system is of course adapted for use upon various types of air craft. For purposes of illustration the airplane A has been illustrated, provided with the ailerons 15 and 16, as control surfaces for maintaining lateral stability, and the elevator 17 for operation as a control surface to maintain longitudinal stability. The airplane fuselage 18 is preferably provided with the ordinary cock pit 19, in which the control stick 20 is mounted for universal control of the ailerons 15 and 16, and the elevator 17, as is the case in ordinary standard construction. The cables 21 and 22, are mounted in any approved manner to the aerofoils for controlling the ailerons 15 and 16 respectively; the cable 23, being suitably connected to the control stick 20 and the elevator 17, for maintaining longitudinal stability.

The automatic electric control system D for maintaining lateral stability, preferably comprises a motor 25, of the reversible type, having a pulley structure 26 mounted on the rotary shaft thereof. A cable 27 and system of pulleys 28 are preferably provided for connection to operate the aileron 15. In like manner, a cable 29 and system of pulleys 30 is provided for operating the aileron 16. The cables 27 and 29 are connected to the pulley 26 of the motor for simultaneous operation. A great many variations in the system of operating the ailerons 15 and 16 from the motor 25 can of course be perfected; the means shown in Figure 1 of the drawings having been shown by way of illustration.

The automatic electric control means D for maintaining longitudinal stability preferably includes a reversible motor 31, of the same type of the motor 25, and having a pulley or windlass 32 thereon for winding of a cable 33; the cable 33 being connected to elevator 17 for operating the same.

Each of the automatic control stabilizing systems D and E includes the improved adjustable circuit controlling device F in circuit with the motors 25 and 31. The adjustable circuit control device F preferably comprises a substantially rectangular casing 35 of sheet metal, having a transparent glass plate 36 centrally mounted therein upon a side 37. The casing 35 is pivotally mounted centrally of its ends 38 and 39, by a detachable pin 40 engaging bearing brackets 41 rigid on the bottom 42 of the casing 35; and supported by pyramidal standards 43. By this arrangement, the casing 35 can be rocked upon the pin 40.

The interior 45 of the casing 35, is provided with a receptacle 46 of novel formation. The receptacle 46 is preferably of glass, or some similar transparent insulating material, including the sump or cup shaped portion 47 disposed centrally in the casing and to be visible through the transparent plate 36. The substantially straight tubular arms 48 and 49 are provided, radiating at an upward slope from the cup portion 47, and enclosed at their outer free ends. A neck 49$^a$ having an opening 50 therein is provided extending upwardly through a filler cap 51 upon the top of the casing 35; said neck 49$^a$ being provided with a cork 52 to maintain the same in sealed condition. This neck 49$^a$ is provided for entrance of a conducting material 53, such as mercury, to be positioned in the sump 47. The receptacle 46 is preferably supported in dependent position by the arms 54, in order to protect the same from breakage or destruction incident to vibration. As heretofore mentioned, the receptacle 47 is clearly visible through the disc 36, said disc 36 being provided to make visible the action of the conducting liquid 53. Suitable indicia 55 is provided upon the plate 36 or may be disposed upon the cup 47, to indicate the relative height of the liquid 53. This liquid 53 is susceptible to deterioration, and for purposes to be subsequently set forth, should always be maintained at an exact height. A pair of contacts or terminals 57 and 58, are positioned in the tube 48 adjacent its outer free end, and communicating exteriorly of the tube 48, in adjustable set screws 59, for clamping of the circuit wires 60 and 61 respectively. Likewise, terminals or contact points 62 and 63 are provided inside of the tube or arm 49 remote from the cup 47, communicating exteriorly of the tube in clamping screws or nuts 64, for the purpose of receiving circuit wires 65 and 66 respectively. The wires 60, 61, 65 and 66 are all brought to a common point 67, for leading exteriorly of the casing 35, into their respective circuits, to be subsequently set forth in describing the wiring diagrams of the longitudinal and lateral stability control systems.

The improved device F is a compound arrangement, serving as a circuit control device, and as a stability recording device. The pivotal mounting of the casing 35 is chiefly desirable in the use of the means F, as a stability registering or recording device. A post 70, has been provided for stationary placement in the cock pit 19, and with respect to the airplane body, having a graduated board 71, slidably and adjustably mounted thereover by rings 72; and adapted to be clamped in position upon the post 70 by a set screw 73. The board 71 is provided with a face thereof, having delineations 74 thereon, preferably in angular measurement. The post 70 and board 71, are preferably placed adjacent an end 38 of the means F, and in such manner that pointer or indicating element 75 of the casing 35, may designate various angular measurements 74 upon the board 71. In this manner, relative movement of the casing 35 on its pivot can be determined with respect to the board 71, which is fixed with respect to the airplane fuselage. When the liquid 53 is level in its cup 47, it is preferred that the pointer 75 designate zero degrees on the board 71. A movement of the pointer 75 upwardly on the board 71 will indicate minus degrees; a movement below the zero degree delineation indication, indicating plus degrees of angular measurement. For a purpose to be subsequently set forth, it will be desirable to maintain the casing 35 in certain determined relation with respect to the indications 74 of the board 71. To this end, an adjustable securing means 76 has been provided.

The means 76 preferably includes a post 77, rigidly mounted in the fuselage 18 of an aircraft A, and spaced adjacent the end 39 of casing 35. A rack 78, is preferably rigidly fixed by rings 79 on the post 77, and having the teeth 80 thereon. A reciprocating pawl rod 81 is mounted in a housing 82, inside of the casing 35; a spring 83 being provided in the housing 82, engaging a disc portion 84 of the rod 81 to normally force a detachable head 85, on the pawl rod 81, into engagement with the teeth 80 of the rack 78. A plate 86, normally guides reciprocatory movement of the rod 81 in the housing 82. The teeth 80 are preferably arcuately placed or positioned on the rack 78, and in such manner that the casing 35 can be readily rocked upon its pivot, whereby the pawl head 85 may engage any of the teeth 80, for fixing the casing 35 in a predetermined position.

As before mentioned, the systems D and E, for lateral and longitudinal stability control respectively, are separate and independent. To this end, the circuit control device F, in circuit with the motor 25, for lateral control of the airplane A, by operation of the ailerons 15 and 16, has been placed transversely of the longitudinal axis of fuselage 18, and preferably below the instrument board 86, or in some position readily discernible from the driver's seat 87. This device F for lateral stability control, rocks upon its pivot 40 in transverse manner for purposes to be subsequently described. The device F for automatic circuit control of the longitudinal stability is preferably placed upon a side 88 of the cock pit 19, and longitudinally of the fuselage 18. Thus, the automatic circuit control F, for longitudinal stability control, rides upon its pivot 40 in parallel relation with the axis of the fuselage 18.

It is a well-known fact that most aircraft, and especially heavier than air types, have a peculiar flying attitude, due to inaccuracies of workmanship in the development of air craft, or to excessive propeller torque. In this flying attitude, the stability of the air craft is assured, and may vary quite a few degrees from the normal even keel of the aircraft. The devices F, are therefore provided, having as a very important use, the ability to record or register the lateral or longitudinal inherent stability of an individual aircraft. The flying attitude cannot be deducted in any theoretic manner, but must be accomplished empirically. Therefore, the pilot taking the airplane A up in flight, assumes the flying attitude for normal flight speed. When in this attitude, the pilot will rock the lateral and longitudinal recording devices F on their respective pivots 40, until the liquid 53 has assumed a level within the cup 47, as indicated by the delineations 55, or by the position of the liquid 53 with respect to the tubes 48 and 49. The liquid thus having been adjusted to be level in the receptacles 46, when the aircraft is in its correct flying attitude; the indicator or pointer 75 will designate the number of degrees on the board 71, which the aircraft is over or under correct flying stability. The casing 35, will, of course, be maintained in the position which the pilot places the same, because of the adjustable fastening means 76. The flying attitude of the aircraft A having been determined both as to longitudinal and lateral stability, all pilots can be informed of this fact, and the exact stability of the air craft thus determined for information for fliers unacquainted with such stability.

The safety switch G is of formation to be universally adapted for control surfaces, either ailerons, elevators or the like. In the illustrations of Figures 8 and 9, the same has been shown for use with an aileron 15. In this construction, the switch structure G is preferably positioned in a rear spar 90 of the aerofoil 91ª, and adjacent the aileron 15. A portion of the spar 90 is hollowed out to provide a pocket for reception of the insulated casing 91. The casing 91, can be of any approved insulated material, and is preferably circular in formation. Leaf spring terminals 92 and 93 of a circuit, are preferably resiliently disposed in the interior 94 of the casing 91; the same being held at one end therein, by instruck portions 95 of the casing, and held at their opposite ends by the adjustable and detachable terminal screws 96. An intermediate portion 97 of each of the springs 92 and 93 is bowed inwardly toward the center of the casing. The terminal springs 92 and 93 are in circuit with conducting cables or wires 98ª, and bound to the casing 91, by the terminal screws 96. A plunger rod 98 is provided for reciprocation centrally in the casing 91, being resiliently forced outwardly toward the aileron 15, by a spring 99, under compression intermediate the bottom 100 of the casing 91, and a disc portion 101 on the plunger rod 98. The plunger rod 98 is preferably in two pieces, to detachably connect a contact head 102, adapted for bridging the gap between the springs terminals 92 and 93. A pointed or bevelled head 103, is preferably formed upon the extreme outer end of the plunger 98, and adapted for riding upon and contacting with a substantially V-shaped plate 104, detachably positioned in the aileron 15.

As illustrated in Figure 8, the contact head 102 is in engagement with the terminal springs 92 and 93, and of course the circuit flows between the cables 98ª. However, as the aileron 15 swings upon its aerofoil 91ª, the plunger rod 98 of course, reciprocates in the casing 91, under expansion of spring 99. As the aileron or control surface 16 reaches its up or down position, to indicate its maximum safety angle, the bevelled head 103 rides over the plate or disc 104, and the spring 99 forces the contact head 102 in such position as to be out of engagement with the terminal springs 92 and 93. In this position, the circuit between the cables 98ª is of course broken, and prevents swinging of the control surface 15 beyond its maximum safety angle to be subsequently described, in specifically setting forth the wiring systems.

First referring to the wiring diagram for the automatic electric control D for lateral stability, and as illustrated in Figure 11 of the drawings. The device F is located in the cock pit of the airplane, transversely of the axis of the machine. In this position the contact terminals 57 and 58, co-act, together with the conducting fluid 53, to operate as a switch structure 106. On the other hand, the terminals 62 and 63 in the tube 49 co-act together with the conducting fluid 53, as a switch structure 107. It is preferred that the conducting wire 61 lead from the device F, directly through the aerofoil to one terminal of a safety switch structure G, located for operation in connection with the aileron 16. A conducting wire 108 leads from a terminal of the switch structure G on aileron 16, into the negative connection of a storage battery 109. The other wire 60 leads from the device F, into an electromagnet structure 110, from whence the same connects by a wire 111 into the positive connection of the storage battery 109. On the other hand, the wire 66 leading from switch 107 is placed upon the aerofoil in any improved manner, to connect with a terminal of the safety switch G mounted for operation upon the aileron 15. A conducting wire 112, conveys the circuit from this switch G into the negative terminal or connection of the storage battery 109. The wire 65, of switch 107 leads into an electromagnet 113, and from whence it is conveyed by conductor 114 into the positive connection of the storage battery 109.

As before stated, the motor 25, will have to be of the reversible type, in order to positively operate the ailerons 15 and 16 for proper lateral guiding of the aircraft A.

It is preferred, that a pole changing switch structure 115, be provided, in connection with the motor 25 to reverse the current, to secure the desired flexibility of said motor. The switch blades 116 and 117 have therefore been provided pivoted respectively at 118 and 119, and provided with the armatures 120 and 121, respectively; said armatures being of course insulated from the blades upon which they are mounted. A spring 122, preferably a leaf spring, is provided for engaging the connecting board 123, for bringing the blades 116 and 117 into neutral position with respect to contacts of the motor 25. It is preferred that the armatures 120 and 121 be adapted for cooperation respectively with the electromagnet structures 110 and 113. The blade 116 is preferably spliced for circuit in the wire 111; while the switch blade 117, is in circuit by a conducting wire 125, preferably leading into a portion of the wire 112, ultimately leading into the negative pole of the storage battery 109. In this connection, it will be observed that the switch wire 125 has a switch structure 126 therein; said switch 126 being in fact the control switch mounted upon the control stick 20.

In operation, the pilot desiring to use the automatic lateral stabilizing or balancing system E, merely close the switch 126 upon the control stick 20. Should the aircraft A dip to the left, the conducting liquid 53 will immediately flow slowly into the tube or arm 48, and bridge the contacts 57 and 58. This in effect will close the switch structure 106. The circuit then flows from the positive connection of the battery 109, energizing the electromagnet 110. The electromagnet 110 attracts the armature 120, and throws the blades 116 and 117, to bridge the contacts 127 and 128, leading by wires 129 and 130 into the motor 25. The current from battery 109 will then flow through the splice 124, through the blade 116, into the motor through conductor 129. The circuit continues through wire 130, out through blade 117, to conducting wire 125, past switch 126, and into the negative terminal of battery 129, actuating the shaft and pulley 26 of the motor 25, and winding the cables 27 and 29 thereon, for operating the ailerons 15 and 16. When the airplane A has gained its stability, the liquid 53 will flow out of the tube 48, and thus break the connection at the switch structure 106, stopping operation of the motor 45. However, should the disc or bank of the airplane A remain over a considerable period of time, the motor 45 will of course operate the ailerons 15 and 16 after they have reached their maximum safety angle. The safety switches G will then break the circuit in their various conducting wires, and de-energize the electromagnets 110 and 113. The leaf spring 122 will then exert itself, and bring the blades 116 and 117 into neutral position, causing the de-energization of the motor 25.

However, should the airplane A dip or bank to the right, the conducting liquid 53 will flow into tube 49 and actuate the switch structure 107. This will energize electromagnet 113, acting upon the armature 121, and causing the blades 116 and 117 to shift upon the contacts 128 and 131 respectively, of the motor. It can readily be seen, that the current will flow from battery 109, through blade 116 of the switch 115, through the wire 130 into the motor 25 in reverse manner from that above described for banking of the airplane A to the left. The current will flow out of motor 25, through the wire 129, across to contact 131 by a connecting wire 132, running through the blade 117, past the closed switch 126, back into the negative pole of the battery 109. This reversal of the current will likewise reverse the motor 25, causing the cables 27 and 29 to wind upon the pulley 28 in reverse manner from that above described, for banking of the machine to the left. The remainder of the operations are identical as above described, for balancing of the air plane A to the left, operating the ailerons 15 and 16 in proper manner, and operating the switches G at the proper time.

Referring now to the wiring diagram for control of longitudinal stability, and as illustrated in Figure 10. The device F is mounted preferably in the cock pit 19 longitudinally of the fuselage 18, and in such manner that the switch structure 107 is disposed toward the propeller of the air plane A. In this position, the switch structure 106 will face toward the elevator control surface 17. As the airplane A dips forwardly, the conducting fluid 53 will of course operate to close the switch structure 107. The current will flow from battery 109, through a conducting wire 135, past the closed switch 136 upon the "joy" stick or control stick 20, from whence the same will be conveyed through the wire 136ᵃ through the electromagnet 137, into the wire 65, through the switch structure 107, rearwardly through a conducting wire 138, through the elevator safety switch G; the elevator safety switch G, being closed, the current will be conveyed through a return wire 139 into the battery 109. The electromagnet 137 being energized by closing up the switch 107, will operate to attract an armature 140 of the pole changing switch 141, similar to the above described pole changing switch 115. It is preferred that the armature 140 be insulated from the blade 142 in order to prevent any liability of short circuit. Upon operation of the switch structure 141, by the electromagnet 137, the current will flow through wire 136ᵃ, into the blade 142, as illustrated in Figure 10, through the contact 143, and through conductor 144 into the motor 31, the current leading out from the motor 31 through wire 145, into the contact 146 and through the blade 148 of switch 141 into a return wire 149. The current then leads through the closed switch structure G, through the return wire 139 into the battery 109. This will actuate the motor shaft and pulley 32 in one direction, marking the elevator 17 to be raised for flattening the airplane A to retain its stability.

On the other hand, should the control system G be brought into play by reason of a tail dip, as to cause the switch 106 to close, the current will energize an electromagnet 150, for effecting an armature 151, on the blade 148 of switch 141. This will operate the switch 141 to bridge the contacts 146 and 152, for sending a current into the motor 31 reversely to that above described for a nose dip of an airplane. The pulley 32 will consequently be operated, in reverse direction, to lower the elevator 17, and bring the propeller end of the airplane A down again into a proper horizontal course. The operation of the system E is automatic, the switch structure G operating to prevent injury to the elevator 17, and maintain the same within its proper working scope.

For aircrafts that have an excessive sway, yet do not off balance permanently, the circuit control device H is provided. The same preferably includes a rectangular casing 155, similar to that above described, for casing 35 of the device A. A receptacle 156, is preferably mounted within the casing 155, the same including a circular sump or cup 157, and the spoon shaped side arms 158 and 159, radiating downwardly and outwardly therefrom in opposite directions. The cup shaped portion 157 is preferably supported on the bottom 160 of the casing 155, in a seat 161; and having a neck 162, leading upwardly through the top 163 of casing 165, for receiving a filler cap 164. A liquid 165 is provided for insertion through the neck 162 into the cup or body portion 167. The arm 158 is preferably provided with upper and lower contact terminals 166 and 167 respectively, having lead wires 168 connected thereto, and leading outwardly from the casing 155 through a guide 169. The spoon 159 is provided with the upper and lower terminals 170 and 171 respectively, for adjustable clamping of the circuit wires 172; the circuit wires 172 being led outwardly from the casing 155, through a guide 173. Each of the spoons 158 and 159 is provided with a dip in its outer end for the reception of the conducting fluid 165. Thus, one of the contacts of each of the arms will be covered with the conducting fluid 165, and prior to contact with the upper terminal.

The above described device, can likewise be used for directional stability of an airplane by appropriate connection to the rudder structure of said aeroplane. The devices F and H can be used to counter-act drift due to heavy lateral winds by setting the same at the appropriate point, thus relieving manual control by the pilot, and taking away great strain upon him. Many uses, can of course be devised from the improved contact control, especially in view of the compound nature for determining inherent stability of individual aircraft, as well as its automatic circuit controlling features.

Various changes in the shape, size, and arrangement of parts may be made to the forms of the invention herein shown and described, without departing from the spirit of the invention, or the scope of the claims.

I claim:

1. In a stability recording device, the combination with an aircraft, of a transparent liquid receptacle including means for determining the gravity level of liquid therein, means pivotally mounting said receptacle on said aircraft, means stationary on said aircraft for determining relative movement of said receptacle with respect to said aircraft, and means for adjustably maintaining said liquid receptacle in fixed position with respect to said stationary means.

2. A balancing system for aircraft comprising controlling surfaces, electrical means for operating said controlling surfaces, and switch means operable by movement of said controlling surfaces, to make or break the circuit through said electrical operating means.

3. A balancing system for aircraft, comprising controlling surfaces, electric motor means for operating said controlling surfaces, and switches in circuit with said electric motor means and directly operable by the controlling surfaces for deenergizing said motor operation when said controlling surfaces have reached their maximum safety angles.

4. A balancing system for aircraft comprising controlling surfaces, electric motor means for operating said controlling surfaces, automatic actuating means in circuit with said motor means, and safety switch means for direct operation by said controlling surfaces.

5. A balancing system for aircraft comprising controlling surfaces, reversible motor means for actuating said controlling surfaces, automatic actuating means in circuit with said reversible motor means, and automatically operated safety switches for operation by said controlling surfaces, and in circuit with said motor means for making and breaking the current upon said controlling surfaces reaching predetermined positions.

6. A circuit control for aircraft comprising a liquid receptacle embodying an enlarged well adapted for receiving a current conveying liquid and having arms radiating outwardly therefrom, and respectively insulated terminals carried by said arms adapted for cooperation with said liquid in the closing of a circuit, said liquid normally being entirely positioned within the enlarged well.

7. A circuit control device for aircraft comprising a receptacle embodying a well for receiving a current conducting liquid and having arms radiating outwardly therefrom and inclined at an angle with respect thereto, spaced cooperating terminals carried outwardly in each of the arms of said receptacle in insulated relation and adapted for cooperation with the liquid within the receptacle when the same bridges the terminals in either of said arms, said liquid being normally positioned entirely within the well of said receptacle.

WILLIAM SHAW FERDON.